Sept. 18, 1945.  G. R. EITNER  2,384,824
LUBRICATING DEVICE
Filed July 10, 1944

Inventor
George R. Eitner
By C. E. Herrstrom & H. E. Thibodeau
Attorneys

Patented Sept. 18, 1945

2,384,824

UNITED STATES PATENT OFFICE 2,384,824

LUBRICATING DEVICE

George R. Eitner, Detroit, Mich.

Application July 10, 1944, Serial No. 544,303

2 Claims. (Cl. 103—178)

(Granted under the act of March 3, 1883, as amended April 30, 1928; 370 O. G. 757)

The invention described herein may be manufactured and used by or for the Government for governmental purposes, without the payment to me of any royalty thereon.

The present invention pertains to a novel lubricating device or grease gun of the type generally employed in connection with automotive equipment.

The device includes a body formed with an internal cylinder and having a piston slidable therein. The piston operates to force a charge of the trapped lubricant into the lubricating fitting. In previous devices of this character the charge is frequently incomplete or less than capacity, or an air pocket may form in the charge, so that the device does not operate at maximum efficiency.

The principal object of the invention is to overcome this difficulty and assure a full charge at all times. To accomplish this object, the intake port to the body is constructed to communicate with the cylinder space above the piston or around the piston rod when the piston is in its lowermost position and also to be uncovered when the piston is raised. A flow channel is provided through the piston from one end to the other thereof and is fitted with a check valve. This construction permits a charge to be drawn into the cylinder above the piston on the downward stroke and beneath the piston on the upward stroke. The upper charge is transferred to the lower side of the piston through the flow path on the upward stroke.

An illustrative embodiment of the invention is disclosed by way of example in the following description and in the accompanying drawing in which.

Figure 1:
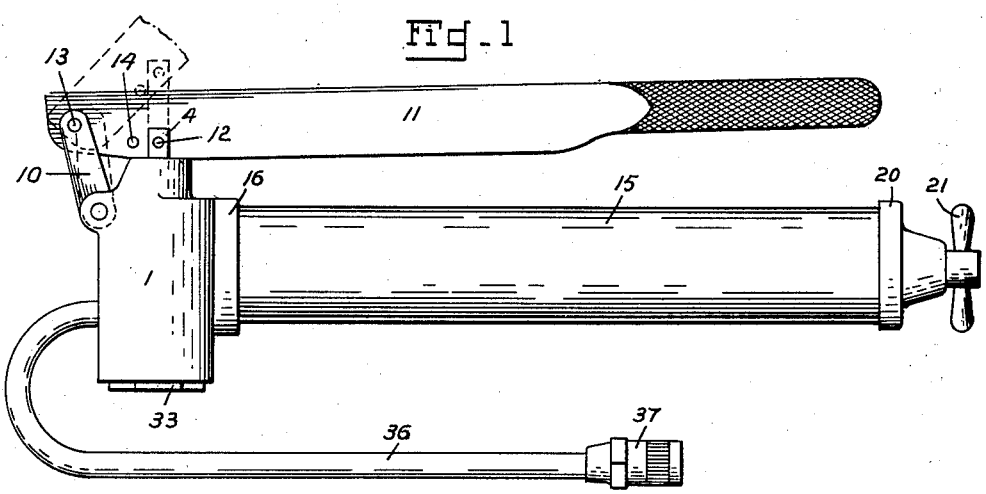
Figure 1 is a vertical elevational view of the device.
Figure 2:
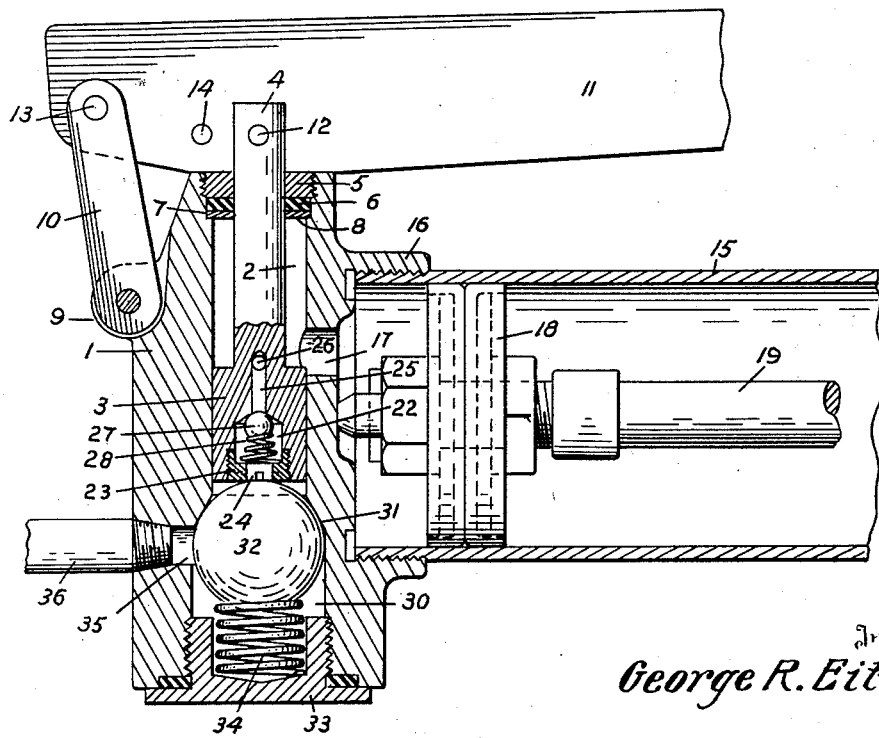
Figure 2 is a vertical cross-sectional view of the device, partially broken away, in a plane parallel to Figure 1.

In Figure 1 the device is shown as comprising a body 1 formed with a cylindrical chamber 2 in which is slidably mounted a piston 3. A piston rod 4 of smaller diameter extends from the piston and through a nut 5 closing the top of the cylinder 2. The nut serves to clamp a gasket 6 and a washer 7 against a shoulder 8 formed in the upper end of the chamber 2.

The body 1 is formed with a lug 9 to which is pivotally attached one end of the link 10. To the other end of the link is pivotally attached one end of an operating lever 11 which has an intermediate point pivotally attached at 12 to the external end of the piston rod 4. Between the point 12 and the pivotal connection 13 of the lever 11 to the link 10, the lever carries a stop pin 14 which abuts the raised piston rod 4 and thereby determines the limit upper position of both parts, as indicated in Figure 1.

A lubricant supply cylinder 15 has one end fitted into a boss 16 formed on the body 1. A port 17 through the body connects the cylinder 15 with the cylinder 2 at a point substantially midway between the ends of the latter. The cylinder 15 contains a piston 18 from which a rod 19 extends through a cap 20 fitted on the rear end of the cylinder. The rod 19 carries a handle 21 for adjusting the piston, and a spring may be placed behind the piston if desired, although in practice the piston is moved forward by suction in the system as will presently be described.

The bottom of the piston 3 is formed with a cavity 22 in the lower end of which is screwed a disk 23 having a port 24. From the cavity 22 a passage 25 extends axially through the piston 3 and into the stem 2 where it connects with a radial passage 26 communicating with the cylinder 2 at a point above the piston 3. The chamber 22 contains a ball valve 27 adapted to seat on the lower end of the passage 25 on which it is held by a coil spring 28 seated on the disk 23.

The body 1 is formed with another chamber 30 below the cylinder 2. The chamber 30 is of larger diameter than the cylinder and is formed with a tapered wall or seat 31 where it joins the cylinder. In the chamber 30 is mounted a ball valve 32 adapted to close against the seat 31. The lower end of the chamber is closed by a nut 33 in which is seated a spring 34 holding the ball 32 on its seat. The wall of the body 1 is formed with an outlet port 35 communicating with the chamber 30 and into the port is screwed one end of a tube 36 carrying at its other end a coupling 37 adapted for connection to a lubrication fitting in a manner well known in the art.

In the operation of the device, on raising the lever 1, a vacuum forms in the cylinder 2 beneath the piston 3 until the lower end of the piston uncovers a portion of the port 17. Lubricant in the cylinder 15 in front of the piston 18 is then drawn into the lower part of the cylinder 2. When the lever 11 is lowered, the pressure on this charge of lubricant opens the valve 32 and closes the valve 27, and the charge is expelled through the port 35. At the same time, a vacuum is formed in the cylinder 2 above the piston 3, and when the upper end of the piston passes the port 17, a charge of lubricant is drawn into the space above the piston. When the lever 11 is again raised and the piston 3 covers the port 17, the upper charge flows into passages 26, 25, opening the valve 27, and transferring to the cylinder space between the piston 3. On the next downward stroke of the lever 11, this charge is expelled through the port 35 and a new charge drawn into the upper part of the cylinder 2 as previously described.

This action of the device assures a full charge of lubricant beneath the piston 3 at the end of each upward stroke thereof and avoids the formation of air pockets which have been found to occur in previous devices. The suction created in the cylinder 2 on the both strokes is ordinarily sufficient to draw the piston 18 against the lubricant in front of it, although the piston may be adjusted manually from time to time or provided with a backing spring as previously indicated.

While a specific embodiment of the invention has been shown and been described, it will be understood that various alterations may be made without departure from the spirit of the invention as indicated by the appended claims.

What I claim is:

1. In a grease gun having a supply receptacle, a body attached to the supply receptacle and having a cylinder therein and an enlarged chamber at one end of said cylinder with a valve seat formed between said cylinder and said chamber, a ball valve in said chamber, said ball valve having a larger diameter than said cylinder and adapted to engage said valve seat to close communication between said cylinder and said chamber, a coil spring in said chamber normally urging said ball valve into seating engagement with said valve seat, said body having an exhaust port from said chamber arranged to provide unrestricted communication with said cylinder through said chamber when said ball valve is unseated, said body also having an intake port establishing communication between said cylinder and said supply receptacle, and a piston reciprocable in said cylinder.

2. In a grease gun having a supply receptacle, a body removably attached to the supply receptacle and having a cylinder therein, a piston reciprocable in said cylinder, a piston rod extending from said piston through said body, actuating means connected to said piston rod to reciprocate said piston in cycles each comprising a pressure stroke and a return stroke, said piston having a passage therethrough, a check valve in said passage normally closed on the pressure stroke of said piston and open on the return stroke thereof, said body having an exhaust port communicating with said cylinder beyond the extreme position of said piston on its pressure stroke, a check valve between said exhaust port and said cylinder, said body also having an intake port establishing communication between said cylinder and said supply receptacle, said intake port being at a location where it is uncovered by said piston when the latter approaches the end of its pressure stroke so that a charge of grease is drawn from the supply receptacle into said cylinder in back of said piston, said intake port also being uncovered by said piston when the latter approaches the end of its return stroke so that a charge of grease is drawn from said supply receptacle into said cylinder ahead of said piston to supplement the charge of grease simultaneously drawn through the passage in said piston from the portion of said cylinder in back of said piston to that in front thereof.

GEORGE R. MITNER.